(12) United States Patent
Innes et al.

(10) Patent No.: US 6,267,799 B1
(45) Date of Patent: *Jul. 31, 2001

(54) METHOD OF PRODUCING METALS AND METAL ALLOYS

(75) Inventors: John Alexander Innes, Melbourne; Robin John Batterham, Sandringham; Rod James Dry, Glen Waverley, all of (AU)

(73) Assignee: Technological Resources Pty. Ltd., Melbourne (AU)

( * ) Notice: Subject to any disclaimer, the term of this patent is extended or adjusted under 35 U.S.C. 154(b) by 0 days.

This patent is subject to a terminal disclaimer.

(21) Appl. No.: 09/550,421

(22) Filed: Apr. 17, 2000

Related U.S. Application Data

(63) Continuation of application No. 08/945,564, filed as application No. PCT/AU96/00197 on Apr. 4, 1996, now Pat. No. 6,083,296.

(30) Foreign Application Priority Data

Apr. 7, 1995 (AU) ................................................ PN 2260

(51) Int. Cl.[7] ............................. C21B 15/00; C21C 5/32; C21C 5/48
(52) U.S. Cl. ................................. 75/502; 75/504; 75/531; 75/549
(58) Field of Search ............................. 75/531, 549, 501, 75/502, 503, 506, 586

(56) References Cited

U.S. PATENT DOCUMENTS

| | | | |
|---|---|---|---|
| Re. 33,464 | 11/1990 | Gitman | 75/483 |
| 2,647,045 | 7/1953 | Rummel | 48/206 |
| 3,844,770 | 10/1974 | Nixon | 75/529 |
| 3,845,190 | 10/1974 | Yosim et al. | 588/201 |
| 3,888,194 | 6/1975 | Kishigami et al. | 588/221 |
| 3,890,908 | 6/1975 | von Klenck et al. | 110/243 |
| 3,894,497 | 7/1975 | Helke et al. | 110/346 |
| 4,007,034 | 2/1977 | Hartwig et al. | 75/491 |
| 4,053,301 | 10/1977 | Stephens, Jr. | 75/10.38 |
| 4,145,396 | 3/1979 | Grantham | 588/201 |
| 4,177,063 | 12/1979 | Dickson | 75/10.67 |
| 4,207,060 | 6/1980 | Zangs | 432/77 |
| 4,356,035 | 10/1982 | Brotzmann et al. | 75/530 |
| 4,389,043 | 6/1983 | Weber et al. | 266/218 |

(List continued on next page.)

FOREIGN PATENT DOCUMENTS

| | | |
|---|---|---|
| A-23864/84 | 1/1984 | (AU) . |
| B-41064/85 | 4/1986 | (AU) . |
| B-69707/87 | 9/1987 | (AU) . |

OTHER PUBLICATIONS

Patent Abstract of Japan, JP, A, 10–280020 (Nippon Steel Corp.), Oct. 20, 1998.
Patent Abstracts of Japan, C–951, p. 24, JP, A, 04–63218 (Kawasaki Heavy Ind. Ltd), Feb. 28, 1992.
Patent Abstracts of Japan, C–627, p. 109, Jp, A, 01–127613 (Kawasaki Steel Corp.), May 19, 1989.

*Primary Examiner*—Roy King
*Assistant Examiner*—Tima McGuthry-Banks
(74) *Attorney, Agent, or Firm*—Merchant & Gould P.C.

(57) ABSTRACT

A method and an apparatus for producing metals and metal alloys from metal oxides in a metallurgical vessel containing a molten bath having a metal layer and a slag layer is disclosed. The method is characterized by injecting a carrier gas and a solid carbonaceous material and/or metal oxides into the molten bath from a side of the vessel that is in contact with the molten bath or from above the molten bath so that the solids penetrate the molten bath and cause molten metal to be projected into the gas space above the molten bath to form a transition zone. The method is also characterized by injecting an oxygen-containing gas into the gas space to post-combust reaction gases released from the molten bath into the transition zone.

40 Claims, 1 Drawing Sheet

U.S. PATENT DOCUMENTS

| | | | |
|---|---|---|---|
| 4,400,936 | 8/1983 | Evans | 588/209 |
| 4,402,274 | 9/1983 | Meenan et al. | 588/209 |
| 4,431,612 | 2/1984 | Bell et al. | 422/186.21 |
| 4,447,262 | 5/1984 | Gay et al. | 588/201 |
| 4,455,017 | 6/1984 | Wunsche | 266/190 |
| 4,468,298 | 8/1984 | Byrne et al. | 205/369 |
| 4,468,299 | 8/1984 | Byrne et al. | 205/369 |
| 4,468,300 | 8/1984 | Byrne et al. | 205/369 |
| 4,481,891 | 11/1984 | Takeshita et al. | 110/238 |
| 4,504,043 | 3/1985 | Yamaoka et al. | 266/160 |
| 4,511,396 | 4/1985 | Nixon | 75/10.41 |
| 4,565,574 | 1/1986 | Katayama et al. | 420/71 |
| 4,566,904 | 1/1986 | von Bogdandy et al. | 75/446 |
| 4,572,482 | 2/1986 | Bedell | 266/47 |
| 4,574,714 | 3/1986 | Bach et al. | 588/201 |
| 4,602,574 | 7/1986 | Bach et al. | 588/201 |
| 4,664,618 | 5/1987 | Gitman | 431/11 |
| 4,681,599 | 7/1987 | Obkircher | 48/92 |
| 4,684,448 | 8/1987 | Itoh et al. | 205/365 |
| 4,701,214 | 10/1987 | Kaneko et al. | 75/481 |
| 4,718,643 | 1/1988 | Gitman | 266/44 |
| 4,786,321 | 11/1988 | Hoster et al. | 75/575 |
| 4,790,516 | 12/1988 | Sugiura et al. | 266/144 |
| 4,798,624 | 1/1989 | Brotzmann et al. | 75/501 |
| 4,849,015 | 7/1989 | Fassbinder et al. | 75/501 |
| 4,861,368 | 8/1989 | Brotzmann et al. | 134/27 |
| 4,874,427 | 10/1989 | Hamada et al. | 75/483 |
| 4,890,562 | 1/1990 | Gitman | 431/10 |
| 4,913,734 | 4/1990 | Romenets et al. | 75/501 |
| 4,923,391 | 5/1990 | Gitman | 432/13 |
| 4,940,488 | 7/1990 | Maeda et al. | 75/500 |
| 4,946,498 | 8/1990 | Weber | 75/436 |
| 4,976,776 | 12/1990 | Elvander et al. | 250/492.2 |
| 4,999,097 | 3/1991 | Sadoway | 204/247.3 |
| 5,005,493 | 4/1991 | Gitman | 110/246 |
| 5,024,737 | 6/1991 | Claus et al. | 205/363 |
| 5,037,608 | 8/1991 | Tarcy et al. | 420/528 |
| 5,042,964 | 8/1991 | Gitman | 432/13 |
| 5,050,848 | 9/1991 | Hardie et al. | 266/81 |
| 5,051,127 | 9/1991 | Hardie et al. | 75/553 |
| 5,065,985 | 11/1991 | Takahashi et al. | 266/156 |
| 5,177,304 | 1/1993 | Nagel | 588/201 |
| 5,191,154 | 3/1993 | Nagel | 588/201 |
| 5,222,448 | 6/1993 | Morgenthaler et al. | 110/346 |
| 5,238,646 | 8/1993 | Tarcy et al. | 420/405 |
| 5,271,341 | 12/1993 | Wagner | 110/346 |
| 5,279,715 | 1/1994 | La Camera et al. | 205/373 |
| 5,301,620 | 4/1994 | Nagel et al. | 110/346 |
| 5,302,184 | * 4/1994 | Batterham et al. | 75/501 |
| 5,322,547 | 6/1994 | Nagel et al. | 75/414 |
| 5,332,199 | 7/1994 | Knapp et al. | 266/225 |
| 5,333,558 | 8/1994 | Lees, Jr. | 110/346 |
| 5,396,850 | 3/1995 | Conochie et al. | 110/346 |
| 5,401,295 | 3/1995 | Brotzmann | 75/500 |
| 5,407,461 | 4/1995 | Hardie et al. | 75/501 |
| 5,415,742 | 5/1995 | La Camera et al. | 205/336 |
| 5,443,572 | 8/1995 | Wilkison et al. | 266/46 |
| 5,480,473 | 1/1996 | Hardie et al. | 75/501 |
| 5,489,325 | 2/1996 | Keogh et al. | 75/443 |
| 5,498,277 | 3/1996 | Floyd et al. | 75/385 |
| 5,518,523 | 5/1996 | Brotzmann | 75/501 |
| 5,529,599 | 6/1996 | Calderon | 75/10.63 |
| 5,613,997 | 3/1997 | Satchell, Jr. | 75/414 |
| 5,640,708 | 6/1997 | Conochie et al. | 588/201 |
| 5,647,888 | 7/1997 | Keogh et al. | 75/443 |
| 5,741,349 | 4/1998 | Hubble et al. | 75/500 |
| 5,800,592 | 9/1998 | den Hartog et al. | 75/453 |
| 5,802,097 | 9/1998 | Gensini et al. | 373/72 |
| 5,938,815 | 8/1999 | Satchell, Jr. | 75/446 |
| 6,083,296 | * 7/2000 | Innes et al. | 75/502 |

FOREIGN PATENT DOCUMENTS

| | | |
|---|---|---|
| B-22448/88 | 5/1989 | (AU) . |
| B-26831/88 | 7/1989 | (AU) . |
| B-28802/89 | 8/1989 | (AU) . |
| A-42859/89 | 4/1990 | (AU) . |
| A-49307/90 | 9/1990 | (AU) . |
| A-49309.90 | 9/1990 | (AU) . |
| B-74840/91 | 10/1991 | (AU) . |
| B-90957/91 | 8/1992 | (AU) . |
| A-48938/93 | 4/1994 | (AU) . |
| B-48937/93 | 5/1994 | (AU) . |
| B-50820/96 | 1/1997 | (AU) . |
| 3139375 | 4/1983 | (DE) . |
| 3244744 | 5/1984 | (DE) . |
| 0 084 288 A1 | 4/1983 | (EP) . |
| 0 079 182 A1 | 5/1983 | (EP) . |
| 422 309 A1 | 4/1991 | (EP) . |
| 541 269 A1 | 5/1993 | (EP) . |
| 592 830 A1 | 4/1994 | (EP) . |
| 657 550 | 6/1995 | (EP) . |
| 2 043 696 A | 10/1980 | (GB) . |
| 2 088 892 A | 6/1982 | (GB) . |
| WO 89/01981 | 3/1989 | (WO) . |
| WO 92/12265 | 7/1992 | (WO) . |
| WO 93/06251 | 4/1993 | (WO) . |
| WO 94/19497 | 9/1994 | (WO) . |
| WO 96/19591 | 6/1996 | (WO) . |
| WO 96/31627 | 10/1996 | (WO) . |
| WO 97/17473 | 5/1997 | (WO) . |
| WO 97/20958 | 6/1997 | (WO) . |
| WO 97/23656 | 7/1997 | (WO) . |
| WO 98/27232 | 6/1998 | (WO) . |
| WO 98/27239 | 6/1998 | (WO) . |
| WO 99/16911 | 4/1999 | (WO) . |

OTHER PUBLICATIONS

WPAT print–out for Brazilian patent application PI9400123–5 (Weber), Sep. 26, 1995.

Patent Abstracts of Japan, C–951, JP, A, 4–63217 (Kawasaki Heavy Ind. Ltd.), Feb. 28, 1992.

Patent abstracts of Japan, C–497, p. 115, JP, A, 62–280315 (Nippon Kokan K.K), Dec. 15, 1987.

Derwent Abstract Accession No. 87–039748/06, JP, A, 61–295334, Dec. 26, 1986.

* cited by examiner

METHOD OF PRODUCING METALS AND METAL ALLOYS

This application is a Continuation of application Ser. No. 08/945,564, filed Mar. 9, 1998, now U.S. Pat. No. 6,083,296, which is a National Stage application of PCT/AU96/00197, filed Apr. 4, 1996.

FIELD OF THE INVENTION

The present invention relates to a method of producing metals and metal alloys, in particular although by no means exclusively iron and iron alloys, from metal oxide, such as ores and partly reduced ores, in a metallurgical vessel containing a molten bath.

BACKGROUND OF THE INVENTION

A known method of producing molten iron from iron ore is described generally as the HIsmelt Process and is based on forming a bath of molten iron and slag in a smelt reduction vessel which comprises:

i. bottom tuyeres for injecting solid carbonaceous material and a carrier gas into the molten bath;

ii. top tuyeres for injecting iron ore, which may be pre-heated and/or partially reduced iron ore, into the molten bath from above the surface of the molten bath; and iii. top tuyeres for injecting air into the space above the surface of the molten bath to after-burn or post-combust reaction gases, such as CO and $H_2$, released from the molten bath.

In accordance with the HIsmelt Process, the carbonaceous material acts as a reductant and an energy source.

An important feature of the HIsmelt Process is to form a transition zone in the gas space above the molten bath surface in which there are ascending and thereafter descending droplets or splashes of molten metal and slag which mix with reaction gases from the molten bath, top blown hot air, and the reaction gases from afterburning. The purpose of the transition zone is to facilitate the transfer to the molten bath of heat that is released by afterburning reaction gases from the molten bath. In accordance with the HIsmelt Process, the transition zone is formed by vigorous bottom injection of carbonaceous material and carrier gas into the molten bath which causes droplets and splashes of molten metal and slag to be projected from the molten bath.

A recent development of the HIsmelt Process is described in Australian patent application 48938/93 entitled "A Method for Intensifying the Reactions in Metallurgical Reaction Vessels" in the name of Technological Resources Pty Limited. The Australian patent application claims a priority date of Oct. 16, 1992 from German patent application 4234974.

The Australian patent application describes that an improvement in heat transfer efficiency of the HIsmelt Process can be obtained by controlling the bottom injection of carbonaceous material and carrier gas so that the transition zone is defined by a "fountain" of splashes and droplets of molten iron and slag. The paragraph bridging pages 5 and 6 of the patent specification of the Australian patent application describes that:

"The invention is also based on the finding that the reactions in metallurgical reaction vessels are increased if fractions of the smelt are ejected from the bath like a fountain through the amount of gas introduced via the under-bath tuyeres and these fractions of the smelt move within the gas space in the form of drops, splashes and large particles of the smelt on ballistic trajectories that are only stopped when the smelt fractions hit the vessel wall or the smelt itself, collide with other smelt fractions or are drawn in by the oxidising gases blown onto the bath in the form of free jets."

An object of the present invention is to provide an alternative method of generating a fountain-like transition zone.

SUMMARY OF THE INVENTION

According to the present invention there is provided a method of producing metals and metal alloys from metal oxides in a metallurgical vessel containing a molten bath, the molten bath comprising a metal layer and a slag layer on the metal layer, the method being characterised by the steps of:

i. injecting a carrier gas and solid carbonaceous material and/or metal oxides and/or other solid material into the molten bath through a section of a side of the vessel that is in contact with the molten bath and/or from above the molten bath so that the carrier gas and solid carbonaceous material and/or metal oxides and/or other solid material cause molten metal to be projected into a space above the surface of the molten bath to form a transition zone; and ii. injecting an oxygen-containing gas into the space above the molten bath surface to afterburn reaction gases released from the molten bath into the transition zone.

The term "transition zone" is understood herein to mean a zone above the molten bath in which there are ascending and thereafter descending droplets or splashes of molten metal.

DETAILED DESCRIPTION OF THE INVENTION

The present invention is based on the realisation that it is possible to form the transition zone of the HIsmelt Process, without loss of the performance and with engineering advantages, by injecting carrier gas and carbonaceous material and/or metal oxides and/or other solid material into a molten bath through a section of a side of a metallurgical vessel that contacts the molten bath and/or from above the surface of the molten bath.

As a consequence, the present invention makes it possible to avoid using bottom injection of carbonaceous material and carrier gas to form the transition zone and the engineering difficulties associated with such bottom injection. One engineering difficulty is that the use of bottom tuyeres makes it necessary to mount the metallurgical vessel for rotation about an axis so that the bottom tuyeres can be rotated clear of the molten bath at turn-down. Furthermore, if bottom tuyeres are eliminated, a much simpler, and more robust, furnace bottom construction is possible.

The present invention is also based on the realisation that, in situations where step (i) includes injecting carbonaceous material, injection through a tuyere as proposed is an effective means of achieving the desirable objective of ensuring that carbonaceous material penetrates the molten bath, and in particular the metal layer of the molten bath.

It is preferred that step (i) comprises injecting the carrier gas and carbonaceous material and/or metal oxides and/or other solid material through the side section of the vessel or from above the surface of the molten bath with sufficient momentum to penetrate the molten bath and cause molten metal to be projected into the space above the molten bath surface to form the transition zone.

It is preferred that step (i) comprises injecting the carrier gas and carbonaceous material and/or metal oxides and/or other solid material into the molten bath to cause the molten metal to be projected into the space above the molten bath surface in a fountain-like manner.

The carbonaceous material may be any suitable carbonaceous material, in solid, liquid or gaseous form.

The metal oxides may be in any suitable form. For example, the metal oxides may be in the form of ores and/or partly reduced ores. The degree of pre-reduction of the ores may range from relatively low (eg to FeO) to relatively high (70–90% metallisation).

The metal oxides may be pre-heated.

The other solid material may be any suitable material, such as, by way of example, fluxes or slag forming agents.

The carrier gas may be any suitable carrier gas.

It is preferred that the carrier gas be an oxygen-deficient gas.

It is preferred that the carrier gas comprise nitrogen.

The carrier gas may comprise waste process gas released from the vessel which has been used, by way of example, to partially reduce metal oxides that subsequently are transferred to the vessel.

The oxygen-containing gas may be any suitable gas such as, but not limited to, air or oxygen enriched air.

It is preferred that the oxygen-containing gas be air.

It is preferred particularly that the air be preheated.

According to the present invention there is also provided an apparatus for producing metals and metal alloys from metal oxides comprising:

i. a metallurgical vessel for containing a molten bath, the vessel having a base, a side wall, a roof, and a gas outlet;

ii. a first tuyere for injecting an oxygen-containing gas into a space in the vessel above the molten bath; and iii. a second tuyere above the molten bath or in a section of the side of the vessel that is in contact with the molten bath for injecting a carrier gas and solid carbonaceous material and/or metal oxides and/or other solid material into the molten bath to cause molten metal to be projected into a space above the surface of the molten bath to form a transition zone.

The term "tuyere" is understood herein to include any means for injecting solids and/or gases into a metallurgical vessel.

An outlet end of the second tuyere may be positioned above the surface of the molten bath or may be submerged in the molten bath.

It is preferred particularly that the second tuyere be positioned to direct the carrier gas and carbonaceous material and/or metal oxides and/or other solid material into the molten bath so that the carrier gas and carbonaceous material and/or metal oxides and/or other solid material can cause molten metal and slag in the molten bath to be projected from the molten bath in a fountain-like manner.

The tuyeres may be any suitable configuration.

It is preferred, although by no means essential, that the tuyeres be water-cooled.

The present invention is described further by way of example with reference to the accompanying drawings in which:

DETAILED DISCUSSION OF THE DRAWINGS

Figure 1:
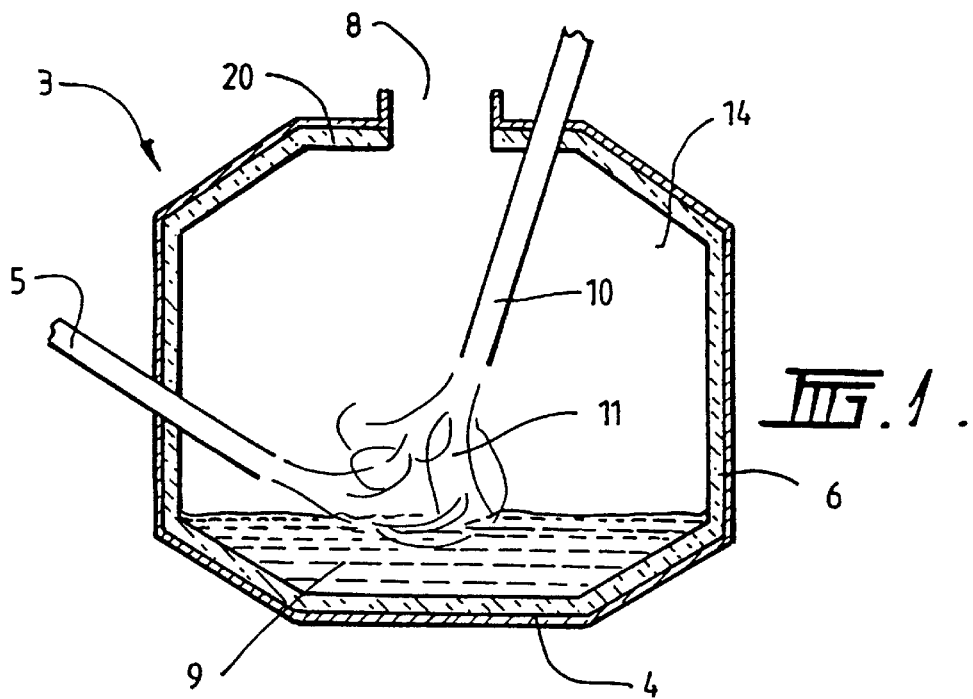
FIG. 1 is a vertical section through one embodiment of a metallurgical vessel in accordance with the present invention for carrying out an embodiment of the method of the present invention.

The following description is in the context of smelting iron ore to produce molten iron and it is understood that the present invention is not limited to this application and is applicable to any suitable metallic ore and/or concentrates.

The figures illustrate, albeit in simplified, schematic form, two embodiments of a wide range of possible embodiments of an apparatus for smelting iron ore in accordance with the present invention.

With reference to the figures, each apparatus comprises a metallurgical vessel 3 having a metal shell and a lining of refractory material which is adapted to retain a bath 9 of molten iron and slag. Each vessel 3 comprises a bottom 4, a cylindrical side wall 6, a roof 20, and a gas outlet 8.

The apparatus is FIG. 1 comprises a single tuyere 5 in the side wall 6 of the vessel 3 which is arranged to extend into the vessel 3 to a position at which, in use, the open end of the tuyere 5 is a short distance above the surface of the molten bath 9. The apparatus in FIG. 2 comprises two diametrically opposed tuyeres 5 in the side wall 6 of the vessel 3. In this embodiment, the open ends of the tuyeres 5 are substantially flush with the inner surface of the side wall 6. As with the arrangement shown in FIG.1, the open ends of the tuyeres are a short distance above the surface of the molten bath 9. It is noted that this is not an essential feature of the present invention, and the open ends may be submerged in the molten bath 9.

In both embodiments, the tuyeres 5 are angled downwardly toward the surface of the molten bath 9.

With further reference to the figures, each apparatus further comprises a tuyere 10 extending generally vertically into the vessel 3 through the roof 20.

In accordance with an embodiment of the method of the present invention, the operating conditions are selected so that coal and iron ore are entrained in a suitable carrier gas, such as nitrogen, and are injected through the tuyere(s) 5 into the molten bath 9 containing molten iron and slag with sufficient momentum to penetrate the molten bath 9 and to cause splashes and droplets of molten iron and slag to be projected upwardly from the surface of the molten bath 9 in a fountain-like manner to form a transition zone 11 in a space 14 in the vessel 3 above the molten bath surface.

Further, a suitable oxygen-containing gas, such as hot air or oxygen enriched air, is injected via the top tuyere 10 into the vessel 3 for the purpose of afterburning reaction gases, such as CO and $H_2$ that are released from the molten bath 9 into the space 14 and otherwise would be discharged from the vessel 3 via the gas outlet 8.

There are number of factors that affect the formation of the transition zone 11 and these include, by way of example:

i. the diameter of the tuyere(s) 5;

ii. the position (including the angle) of the tuyere(s) 5 with respect to the surface of the molten bath 9;

iii. the momentum of the stream of coal/ore/carrier gas/other solid material injected through the tuyere(s) 5; and iv. the number of the tuyere(s) 5 and the size of the vessel 3.

Figure 2:
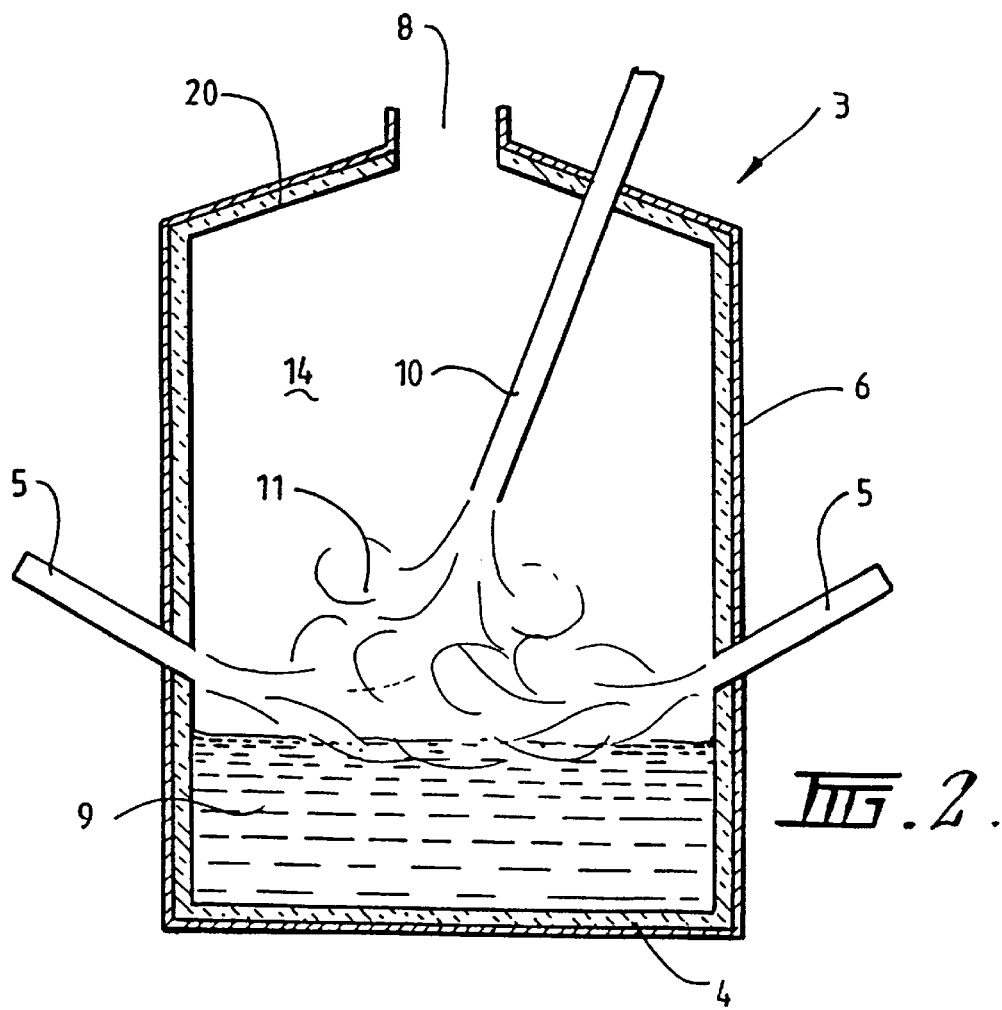
FIG. 2 is a vertical section through another embodiment of a metallurgical vessel in accordance with the present invention for carrying out the embodiment of the method of the present invention.

With regard to item (ii), in the context of the preferred embodiment shown in FIGS. 1 and 2, the tuyere(s) 5 may be located in the side wall 6 of the vessel 3 at any position above or below a suitable reference surface of the molten metal bath 9 provided that the angle of injection and the other factors noted above are such that the stream(s) of coal/ore/carrier gas injected, in use, through the tuyere(s) 5 can penetrate the molten bath 9 as required to cause splashes and droplets of molten iron and slag to be projected from the molten bath 9 to form as a fountain to form the transition zone 11. One suitable reference surface may be the quiescent level of the molten bath 9, i.e. the level of the molten bath prior to injection of materials into the vessel 3. Whilst not wishing to be limited to any specific dimensions, typically, the open end(s) of the side tuyere(s) 5 may be in the range of 0.5 meters above to 0.5 meters below the reference surface of the molten bath 9.

With regard to item (iii), the momentum of the stream of coal/ore/carrier gas injected through the tuyere(s) 5 is dependent on a number of factors including, but not limited to, the velocity of the stream, the solids loading the stream, and the required size of the transition zone 11.

In any given situation, an optimum set of operating conditions can be determined by consideration of the above (and other relevant) factors.

As is discussed above, it is believed by the applicant that the method and apparatus of the present invention make it possible to simplify the engineering associated with bath smelting processes where after-burning is achieved in the gas space above the molten bath, such as the HIsmelt Process.

In addition, it is believed by the applicant that the method and apparatus of the present invention make it possible to use relatively wide diameter tuyeres 5 which would provide an additional advantage of the present invention of minimising the risk of blockage and making it possible to inject a wider size range of coal and/or ore through the tuyeres 5.

Many modifications may be made to the embodiments of the method and the apparatus described above with reference to the drawings without departing from the spirit and scope of the present invention.

By way of example, whilst the preferred embodiments described above include a cylindrical vessel 3, it can readily be appreciated that the present invention is not so limited and may be any suitable shape of pressurised or unpressurised vessel.

Further, whilst the preferred embodiments are based on the use of coal/ore/carrier gas to provide sufficient momentum, the present invention is not so limited and extends to the separate use of coal or ore with a suitable carrier gas.

Furthermore, as indicated previously, whilst the tuyeres 5 of the preferred embodiments are positioned so that the open ends of the tuyeres 5 are above the surface of the molten bath, the present invention is not so limited and extends to arrangements in which the open ends of tuyeres 5 are submerged in the molten bath 9.

Furthermore, whilst the tuyeres 5 of the preferred embodiments are positioned in the sides 6 of the vessel 3, the present invention extends to arrangements in which the tuyeres 5 are arranged to extend into the vessel through the roof 20.

Finally, whilst the tuyere 10 for oxygen-containing gas injection shown in the figures extends through the roof 20 in a generally vertical orientation, the present invention is not so limited and the tuyere 10 may be positioned in any suitable location to efficiently after-burn reaction gases released from the molten bath 9.

What is claimed is:

1. A method of producing metals and metal alloys from metal oxides in a metallurgical vessel containing a molten bath, said vessel comprising a sidewall and a roof, the molten bath comprising a metal layer and a slag layer on the metal layer, the method comprising:

(i) injecting a solid material being solid carbonaceous material an/or metal oxides with a carrier gas through one or more than one tuyere into the molten bath, wherein each tuyere injecting solid material is angled downwardly and the injected solid material has sufficient momentum so that the solid material and the carrier gas penetrates the metal layer of the molten bath and causes a molten material being molten metal and/or slag to be projected into a space above the surface of the molten bath to form a transition zone; and (ii) injecting an oxygen-containing gas into the space above the molten bath surface to afterburning reaction gases released from the molten bath into the transition zone; and wherein step (i) comprises injecting the solid material and the carrier gas into the molten bath through one or more than one tuyere that is angled downwardly and has an outlet end that is submerged in the molten bath.

2. The method defined in claim 1 wherein step (i) comprises injecting the solid material and the carrier gas through one or more than one tuyere extending through the roof of the vessel.

3. The method defined in claim 1 wherein the molten material is projected into the space above the molten bath surface in a fountain-like manner.

4. The method defined in claim 1 wherein step (i) further comprises injecting other solid material with the carrier gas.

5. The method defined in claim 4 wherein the other solid material comprises one or more of fluxes or slag forming agents.

6. The method defined in claim 1 wherein the oxygen-containing gas is preheated air.

7. A method of producing metals and metal alloys from metal oxides in a metallurgical vessel containing a molten bath, said vessel comprising a sidewall and a roof, the molten bath comprising a metal layer and a slag layer on the metal layer, the method comprising:

(i) injecting a solid material being solid carbonaceous material and/or metal oxides with a carrier gas through one or more than one tuyere into the molten bath, wherein each tuyere injecting solid material in angled downwardly and the injected solid material has sufficient momentum so that the solid material and the carrier gas penetrates the metal layer of the molten bath and causes a molten material being molten metal and/or slag to be projected into a space above the surface of the molten bath to form a transition zone; and (ii) injecting an oxygen-containing gas into the space above the molten bath surface to afterburn reaction gases released from the molten bath into the transition zone; and wherein the metal oxides are in the form of ores and/or partly reduced ores.

8. The method defined in claim 7 wherein step (i) comprises injecting the solid material and the carrier gas into the molten bath through one or more than one tuyere that is angled downwardly and has an outlet end that is above the molten bath.

9. The method defined in claim 7 wherein step (i) comprises injecting the solid material and the carrier gas into the molten bath through one or more tuyere that is angled downwardly and has an outlet end that is submerged in the molten bath.

10. The method defined in claim 7 wherein step (i) comprises injecting the solid material and the carrier gas through one or more than one tuyere extending though the roof of the vessel.

11. The method defined in claim 7 wherein the molten material is projected into the space above the molten bath surface in a fountain-like manner.

12. The method defined in claim 7 wherein step (i) further comprises injecting other solid material with the carrier gas.

13. The method defined in claim 12 wherein the other solid material comprises one or more of fluxes or slag forming agents.

14. The method defined in claim 7 wherein the oxygen-containing gas is preheated air.

15. The method defined in claim 7 wherein step (i) comprises injecting carbonaceous material and metal oxides through the same tuyere or tuyeres.

16. The method defined in claim 7 wherein step (i) comprises injecting carbonaceous material and metal oxides through separate tuyeres.

17. A method of producing metals and metal alloys from metal oxides in a metallurgical vessel containing a molten bath, said vessel comprising a sidewall and a roof, the molten bath comprising a metal layer and a slag layer on the metal layer, the method comprising:
  (i) injecting a solid material being solid carbonaceous material and/or metal oxides with a carrier gas through one or more than one tuyere into the molten bath, wherein each tuyere injecting solid material is angled downwardly and the injected solid material has sufficient momentum so that the solid material and the carrier gas penetrates the metal layer of the molten bath and causes a molten material being molten metal and/or slag to be projected into a space above the surface of the molten bath to form a transition zone; and
  (ii) injecting an oxygen-containing gas into the space above the molten bath surface to afterburn reaction gases released from the molten bath into the transition zone; and wherein the metal oxides are pre-heated, and wherein the carrier gas is a oxygen-deficient gas.

18. The method defined in claim 17 wherein step (i) comprises injecting the solid material and the carrier gas into the molten bath through one or more than one tuyere that is angled downwardly and has an outlet end that is submerged in the molten bath.

19. The method defined in claim 17 wherein step (i) comprises injecting the solid material and the carrier gas into the molten bath through one or more than one tuyere that is angled downwardly and has an outlet end that is above the molten bath.

20. The method defined in claim 17 wherein step (i) comprises injecting the solid material and the carrier gas through one or more than one tuyere extending through the roof of the vessel.

21. The method defined in claim 17 wherein the molten material is projected into the space above the molten bath surface in a fountain-like manner.

22. The method defined in claim 17 wherein the metal oxides are in the form of ores and/or partly reduced ones.

23. The method defined in claim 17 wherein step (i) further comprises injecting other solid material with the carrier gas.

24. The method defined in claim 23 wherein the other solid material comprises one or more of fluxes or slag forming agents.

25. The method defined in claim 17 wherein the carrier gas comprises nitrogen.

26. The method defined in claim 17 wherein the carrier gas comprises waste reaction gas released from the vessel which has been used to partially reduce metal oxides that subsequently are transferred to the vessel, and wherein step (i) comprises injecting carbonaceous material and metal oxides through separate tuyeres.

27. A method of producing metals and metal alloys from metal oxides in a metallurgical vessel containing a molten bath, said vessel comprising a sidewall and a roof, the molten bath comprising a metal layer and a slag layer on the metal layer, the method comprising:
  (i) injecting a solid material being solid carbonaceous material and/or metal oxides with a carrier gas through one or more than one tuyere into the molten bath, wherein each tuyere injecting solid material is angled downwardly and the injected solid material has sufficient momentum so that the solid material and the carrier gas penetrates the metal layer of the molten bath and causes a molten material being molten metal and/or slag to be projected into a space above the surface of the molten bath to form a transition zone; and
  (ii) injecting an oxygen-containing gas into the space above the molten bath surface to afterburn reaction gases released from the molten bath into the transition zone; and wherein step (i) comprises injecting carbonaceous material and metal oxides through the same tuyere or tuyeres.

28. The method defined in claim 27 wherein step (i) comprises injecting the solid material and the carrier gas into the molten bath through one or more than one tuyere that is angled downwardly and has an outlet end that is submerged in the molten bath.

29. The method defined in claim 27 wherein step (i) comprises injecting the solid material and the carrier gas into the molten bath through one or more than one tuyere that is angled downwardly and has an outlet end that is above the molten bath.

30. The method defined in claim 27 wherein step (i) comprises injecting the solid material and the carrier gas through one or more than one tuyere extending through the roof of the vessel.

31. The method defined in claim 27 wherein the molten material is projected into the space above the molten bath surface in a fountain-like manner.

32. The method defined in claim 27 wherein step (i) further comprises injecting one or more of fluxes or slag forming agents with the carrier gas.

33. The method defined in claim 27 wherein the carrier gas comprises nitrogen.

34. A method of producing metals and metal alloys from metal oxides in a metallurgical vessel containing a molten bath, said vessel comprising a sidewall and a roof, the molten bath comprising a metal layer and a slag layer on the metal layer, the method comprising:
  (i) injecting a solid material being solid carbonaceous material and/or metal oxides with a carrier gas through one or more than one tuyere into the molten bath, wherein each tuyere injecting solid material is angled downwardly and the injected solid material has sufficient momentum so that the solid material and the carrier gas penetrates the metal layer of the molten bath and causes a molten material being molten metal and/or slag to be projected into a space above the surface of the molten bath to form a transition zone; and
  (ii) injecting an oxygen-containing gas into the space above the molten bath surface to afterburn reaction gases released from the molten bath into the transition zone; and wherein step (i) comprises injecting carbonaceous material and metal oxides through the separate tuyeres.

35. The method defined in claim 34 wherein step (i) comprises injecting the solid material and the carrier gas into the molten bath through one or more than one tuyere that is angled downwardly and has an outlet end that is submerged in the molten bath.

36. The method defined in claim 34 wherein step (i) comprises injecting the solid material and the carrier gas into the molten bath through one or more than one tuyere that is angled downwardly and has an outlet end that is above the molten bath.

37. The method defined in claim 34 wherein step (i) comprises injecting the solid material and the carrier gas through one or more than one tuyere extending through the roof of the vessel.

38. The method defined in claim 34 wherein the molten material is projected into the space above the molten bath surface in a fountain-like manner.

39. The method defined in claim 34 wherein step (i) further comprises injecting one or more of fluxes or slag forming agents with the carrier gas.

40. The method defined in claim 34 wherein the carrier gas comprises nitrogen.

* * * * *